US011970950B2

(12) United States Patent
Okajima et al.

(10) Patent No.: US 11,970,950 B2
(45) Date of Patent: Apr. 30, 2024

(54) CERAMIC COATING, TURBINE COMPONENT, AND GAS TURBINE

(71) Applicant: MITSUBISHI HEAVY INDUSTRIES, LTD., Tokyo (JP)

(72) Inventors: Yoshifumi Okajima, Tokyo (JP); Taiji Torigoe, Tokyo (JP); Masahiko Mega, Tokyo (JP); Hiroki Komuro, Tokyo (JP); Sosuke Kawasumi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/765,063

(22) PCT Filed: Mar. 26, 2021

(86) PCT No.: PCT/JP2021/012809
§ 371 (c)(1),
(2) Date: Mar. 30, 2022

(87) PCT Pub. No.: WO2021/200634
PCT Pub. Date: Oct. 7, 2021

(65) Prior Publication Data

US 2022/0389835 A1 Dec. 8, 2022

(30) Foreign Application Priority Data

Mar. 30, 2020 (JP) ................................ 2020-059326

(51) Int. Cl.
*F01D 25/00* (2006.01)

(52) U.S. Cl.
CPC ........ *F01D 25/005* (2013.01); *F05D 2220/32* (2013.01); *Y10T 428/12535* (2015.01)

(58) Field of Classification Search
CPC .......... F01D 25/005; Y10T 428/12535; F05D 2220/32
(Continued)

(56) References Cited

U.S. PATENT DOCUMENTS

2013/0202912 A1 8/2013 Torigoe et al.
2016/0281205 A1 9/2016 Strock
(Continued)

FOREIGN PATENT DOCUMENTS

CN 107208246 9/2017
DE 11 2017 002 907 3/2019
(Continued)

OTHER PUBLICATIONS

International Search Report dated Jun. 15, 2021 in International (PCT) Application No. PCT/JP2021/012809.
(Continued)

*Primary Examiner* — Katherine A Christy
(74) *Attorney, Agent, or Firm* — Wenderoth, Lind & Ponack, L.L.P.

(57) ABSTRACT

A ceramic coating according to at least one embodiment of the present disclosure includes: a bond coat layer formed on a substrate; and a ceramic layer formed on the bond coat layer. The ceramic layer has a first region in contact with an interface between the ceramic layer and the bond coat layer and a second region father away from the interface than the first region from the interface. In a cross-section along a thickness direction of the ceramic layer, the number of crack intersection points at which two or more cracks intersect per unit area in the ceramic layer is larger in the first region than in the second region.

9 Claims, 8 Drawing Sheets

(58) Field of Classification Search
USPC .......................................................... 428/621
See application file for complete search history.

(56) References Cited

U.S. PATENT DOCUMENTS

| | | | | |
|---|---|---|---|---|
| 2018/0030584 | A1* | 2/2018 | Inoue .................. | C23C 28/3455 |
| 2019/0119804 | A1 | 4/2019 | Tanigawa et al. | |
| 2020/0048751 | A1 | 2/2020 | Okajima et al. | |

FOREIGN PATENT DOCUMENTS

| | | |
|---|---|---|
| JP | 2001-279418 | 10/2001 |
| JP | 2010-144211 | 7/2010 |
| JP | 2010-242223 | 10/2010 |
| JP | 5602156 | 10/2014 |
| JP | 2018-184642 | 11/2018 |

OTHER PUBLICATIONS

Office Action issued Feb. 2, 2024, in counterpart CN Application No. 202180005596.2.

* cited by examiner

CERAMIC COATING, TURBINE COMPONENT, AND GAS TURBINE

TECHNICAL FIELD

The present disclosure relates to a ceramic coating, a turbine component, and a gas turbine.

This application claims priority based on Japanese patent application No. 2020-059326, filed with the Japanese Patent Office on Mar. 30, 2020, the contents of which are hereby incorporated herein.

BACKGROUND

The temperature of the gas used in a gas turbine is set high in order to improve the efficiency. Turbine components such as rotor blades and stator blades exposed to hot gas are coated with a thermal barrier coating (TBC). The thermal barrier coating is a thermal spray material with low thermal conductivity (e.g., a ceramic-based material with low thermal conductivity) coated on the surface of a turbine component, which is an object to be thermally sprayed. By forming the thermal barrier coating on the surface, the temperature of the hot component exposed to high temperature and high pressure environment drops, and the durability is improved (see Patent Document 1).

CITATION LIST

Patent Literature

Patent Document 1: JP5602156B

SUMMARY

Problems to be Solved

Since a gas turbine is repeatedly started and stopped relatively often, the thermal barrier coating (ceramic coating) is required to have thermal cycle durability in addition to heat insulation properties.

In view of the above, an object of at least one embodiment of the present disclosure is to improve the thermal cycle durability of the thermal barrier coating.

Solution to the Problems (1) A ceramic coating according to at least one embodiment of the present disclosure includes a bond coat layer formed on a substrate; and a ceramic layer formed on the bond coat layer. The ceramic layer has a first region in contact with an interface between the ceramic layer and the bond coat layer and a second region father away from the interface than the first region from the interface. In a cross-section along a thickness direction of the ceramic layer, the number of crack intersection points at which two or more cracks intersect per unit area in the ceramic layer is larger in the first region than in the second region.

(2) A turbine component according to at least one embodiment of the present disclosure includes the ceramic coating according to the above configuration (1).

(3) A gas turbine according to at least one embodiment of the present disclosure includes the turbine component according to the above configuration (2).

Advantageous Effects

According to at least one embodiment of the present disclosure, it is possible to improve the thermal cycle durability of the ceramic coating.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Ceramic Coating 10)

Figure 1:
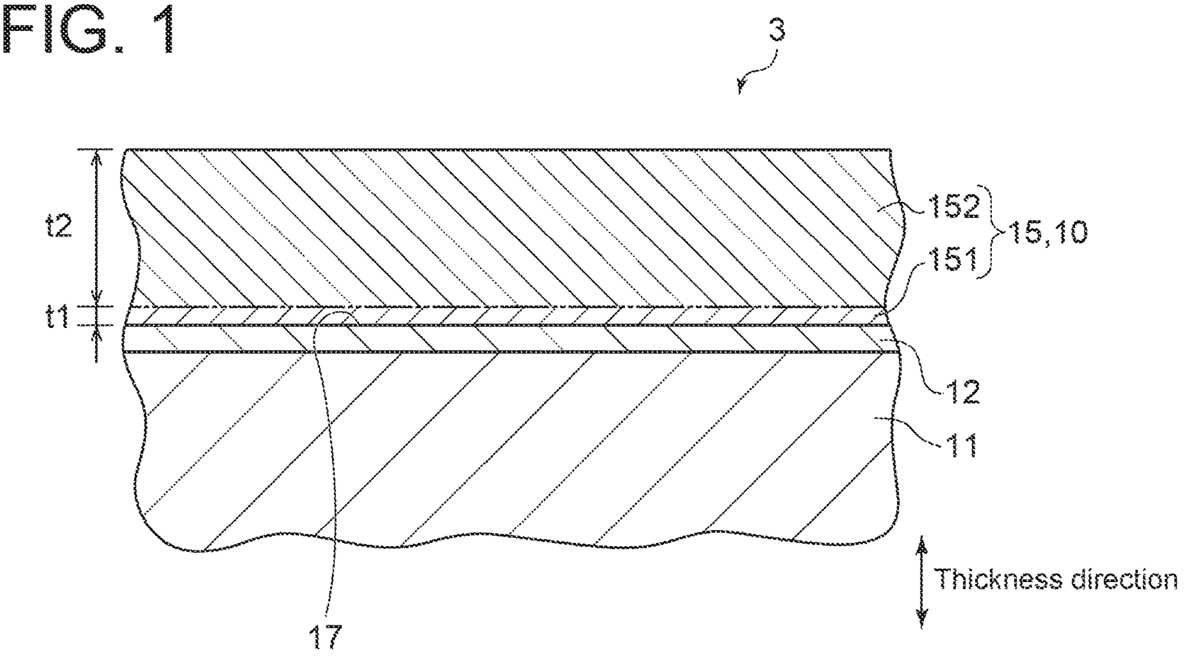
FIG. 1 is a schematic cross-sectional view of a turbine component including a ceramic coating according to an embodiment.
Figure 2:
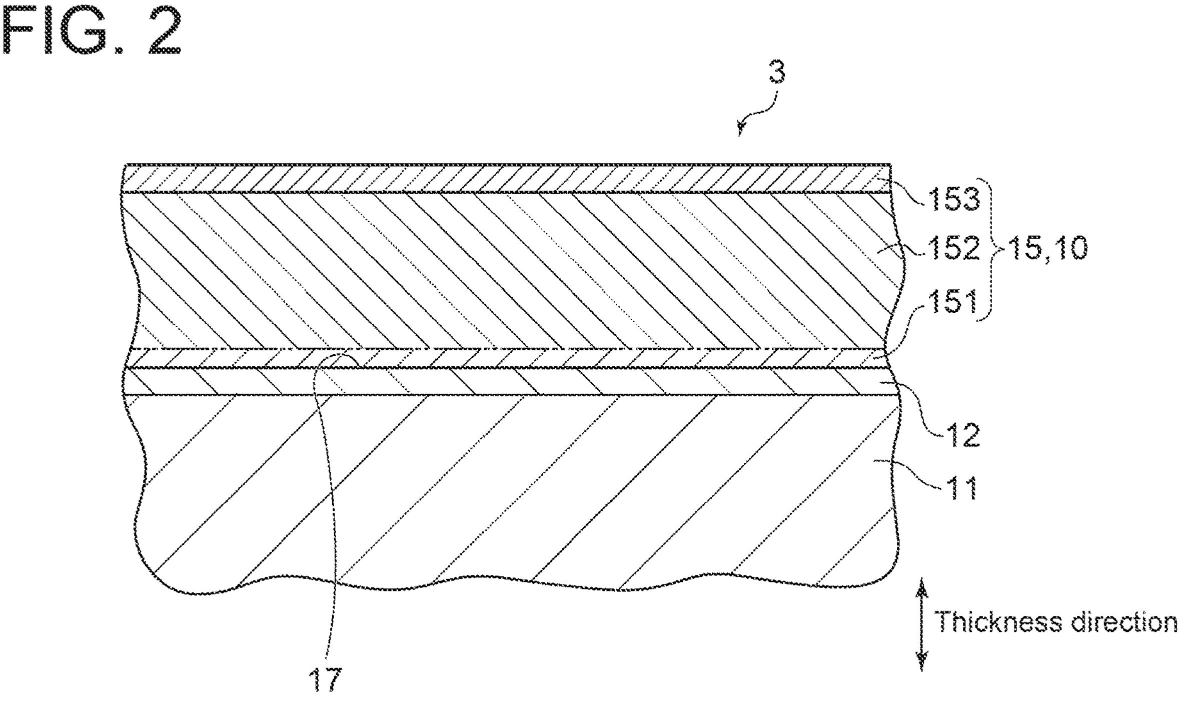
FIG. 2 is a schematic cross-sectional view of a turbine component including a ceramic coating according to another embodiment.
Figure 7:
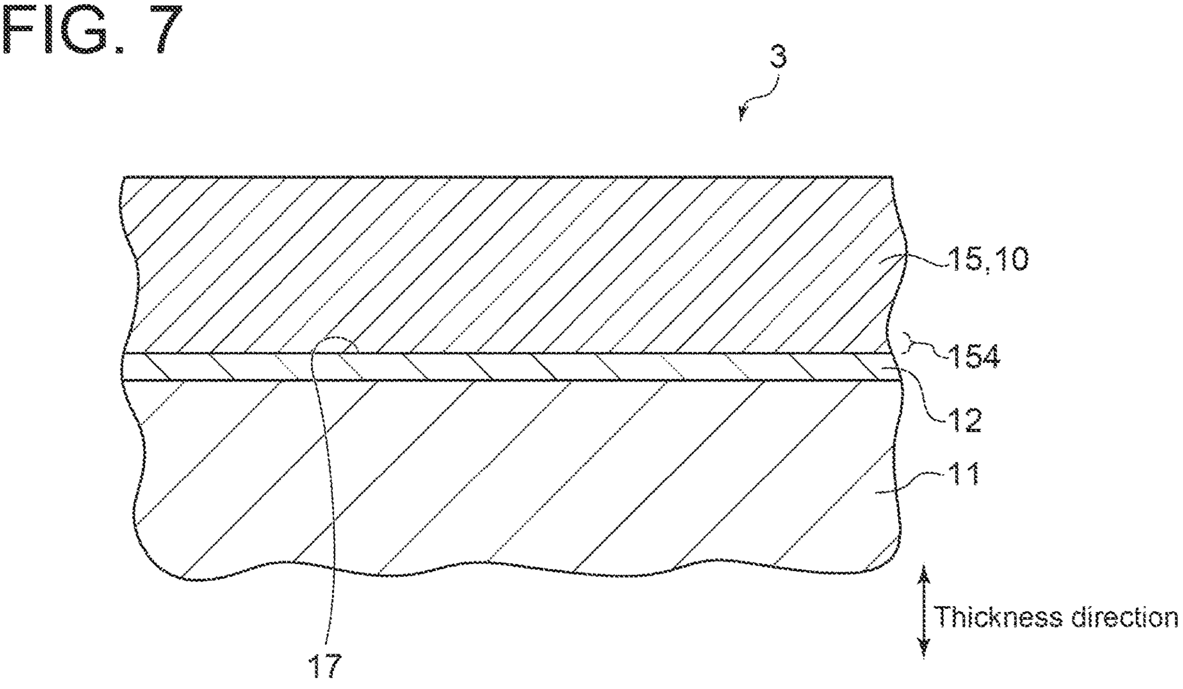
FIG. 7 is a schematic cross-sectional view of a turbine component including a ceramic coating according to still another embodiment.

FIG. 1 is a schematic cross-sectional view of a turbine component 3 including a ceramic coating 10 according to an embodiment. FIG. 2 is a schematic cross-sectional view of a turbine component 3 including a ceramic coating 10 according to another embodiment. FIG. 7 is a schematic cross-sectional view of a turbine component 3 including a ceramic coating 10 according to still another embodiment.

In some embodiments described below, as an example of the ceramic coating 10, a thermal barrier coating for thermal barrier of the turbine component 3 will be described.

As shown in FIGS. 1, 2, and 7, in some embodiments, a metallic bond layer (bond coat layer) 12 and a ceramic layer 15 as a thermal barrier coating are sequentially formed on a heat resistant substrate (base material) 11 of the turbine component 3 such as a rotor blade 4 and a stator blade 5 of a gas turbine 6, which will be described later. In other words, as shown in FIGS. 1 and 2, in some embodiments, the ceramic coating 10 is a thermal barrier coating (TBC) layer, and includes the ceramic layer 15.

The bond coat layer 12 is composed of MCrAlY alloy, where M represents a metallic element such as Ni, Co, or Fe or a combination of two or more of them.

The ceramic layer 15 according to some embodiments may be composed of a $ZrO_2$-based material, for example, yttria-stabilized zirconia (YSZ) which is $ZrO_2$ partially or completely stabilized with $Y_2O_3$.

(Relationship Between Number of Crack Intersection Points 33 and Effect of Suppressing Growth of Delamination Crack)

As shown in FIGS. 1 and 2, in some embodiments, the ceramic layer 15 has a first region 151 in contact with an interface 17 between the ceramic layer 15 and the bond coat layer 12 and a second region 152 father away from the interface 17 than the first region 151 from the interface 17.

In the ceramic coating 10 according to another embodiment shown in FIG. 2, the ceramic layer 15 has a third region 153 father away from the interface 17 than the second region 152 from the interface 17.

In some embodiments, in a cross-section along the thickness direction of the ceramic layer 15, the number of crack intersection points 33 (see FIG. 3) at which two or more cracks intersect per unit area in the ceramic layer 15 is larger in the first region 151 than in the second region 152. This is to suppress the growth of delamination crack in the ceramic layer 15 as described in detail below.

Figure 3:
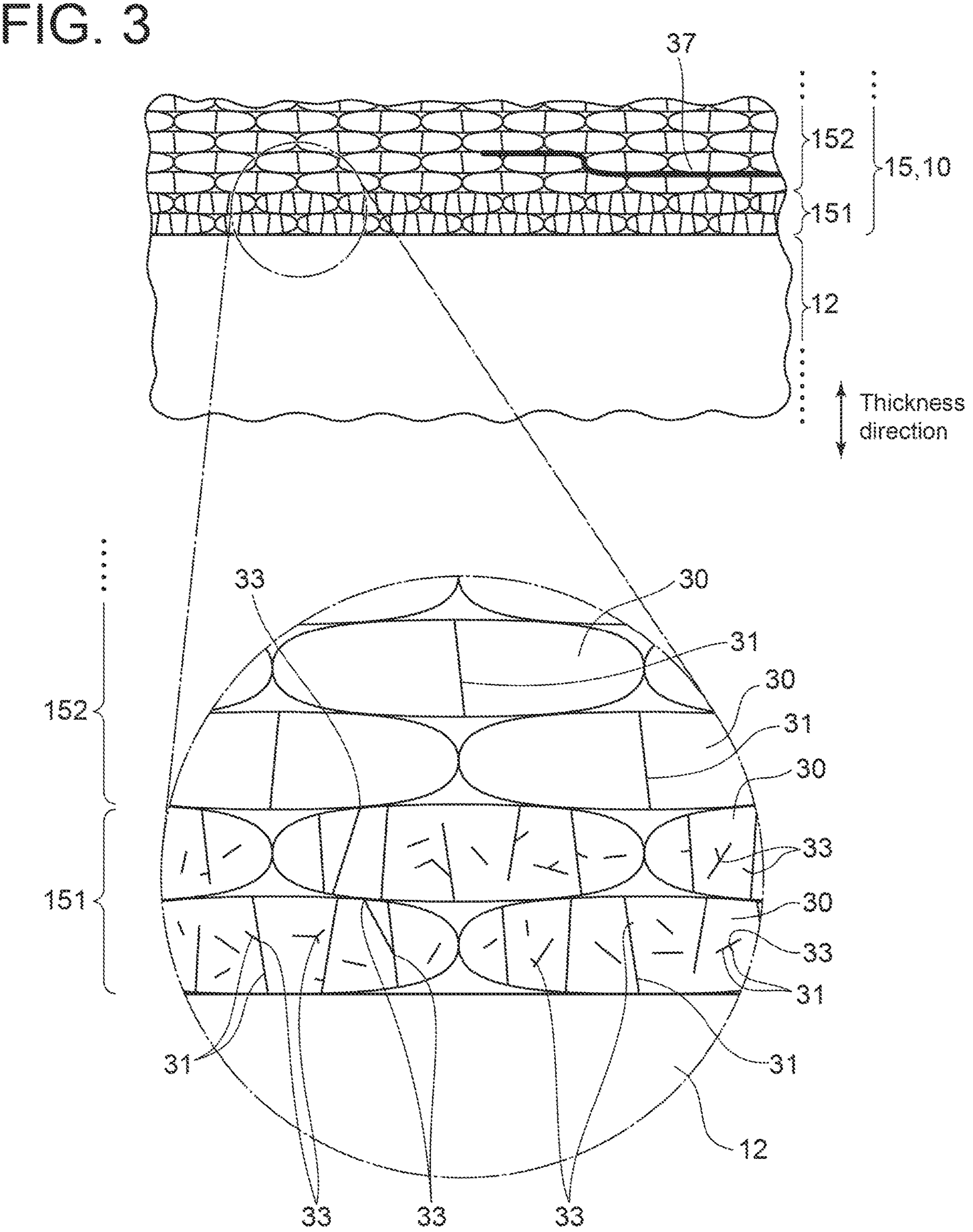
FIG. 3 is a schematic diagram of a cross-section in the vicinity of an interface in a turbine component.

FIG. 3 is a schematic diagram of a cross-section in the vicinity of the interface 17 in the turbine component 3 shown in FIGS. 1 and 2. In FIG. 3, the shape of a splat 30 described later is represented by an elliptical shape. Therefore, there is a gap between adjacent ellipses, but in practice, it is possible to make this gap almost nonexistent.

Since the coefficient of linear expansion differs between the heat resistant substrate 11 and the ceramic layer 15, thermal stress acts on the heat resistant substrate 11 and the ceramic layer 15 due to a change in temperature. Therefore, when the heat resistant substrate 11 and the ceramic layer 15 are repeatedly heated and cooled, a lateral crack (delamination crack) 37 extending along the interface 17 may occur mainly in the vicinity of the interface 17 in the ceramic layer 15. In other words, the delamination crack 37 more easily occurs in the first region 151 than in the second region 152. As the length of the delamination crack 37 increases, the ceramic layer 15 may separate from the heat resistant substrate 11. In FIG. 3, the delamination crack 37 is schematically represented by the bold solid line.

For example, when the ceramic layer 15 is formed by thermal spraying, the thermal spray material collides with the bond coat layer 12 and is repeatedly flattened and solidified, so that flattened particles (splats) 30 are laminated, and the thermal spray coating, that is, the ceramic layer 15 is formed.

Generally, the ceramic layer 15 has a plurality of small cracks 31. The small crack 31 includes a crack occurring in the splat 30 in the process of the thermal spray material colliding with the bond coat layer 12 to flatten and solidify, and a remaining boundary between the adjacent splats 30. Two or more small cracks 31 often intersect. In the following, the intersection at which two or more small cracks 31 intersect is referred to as a crack intersection point 33.

The length of the small crack 31 is about 5 μm to 100 μm.

As described above, since two or more cracks 31 intersect at the crack intersection point 33, the cracks 31 extend in three or more directions around the crack intersection point 33. Specifically, in a region where the number of crack intersection points 33 per unit volume is relatively large, relatively small cracks 31 tend to exist in a mesh pattern. As the number of crack intersection points 33 per unit volume increases, the number of crack intersection points 33 appearing in a cross-section along the thickness direction of the ceramic coating 10 tends to increase, for example.

When the delamination crack 37 occurs under the influence of thermal stress, and a crack due to the delamination crack 37 reaches the crack intersection point 33 or the cracks 31 connected to the crack intersection point 33, the energy for growing the crack caused by the delamination crack 37 is transmitted and dispersed along the cracks 31 intersecting at the crack intersection point 33. As a result, the growth of the crack due to the delamination crack 37 is suppressed.

Thus, according to some embodiments shown in FIGS. 1 and 2, since the number of crack intersection points 33 per unit area is larger in the first region 151 than in the second region 152, the growth of a crack due to the delamination crack 37 is suppressed in the first region 151 as compared with the second region 152. Therefore, in the first region 151 where the delamination crack 37 is more likely to occur than in the second region 152, the growth of a crack due to the delamination crack 37 can be effectively suppressed, and the thermal cycle durability of the ceramic coating 10 can be improved.

(Number of Crack Intersection Points 33)

In some embodiments shown in FIGS. 1 and 2, the number of crack intersection points 33 per unit area in the first region 151 may be 15,000 per $mm^2$ or more and 35,000 per $mm^2$ or less.

As a result of diligent studies by the inventors, it has been found that when the number of crack intersection points 33 per unit area in the first region 151 is less than 15,000 per $mm^2$, the effect of improving the thermal cycle durability of the ceramic coating 10 is hardly obtained. It has been also found that when the number of crack intersection points 33 per unit area is more than 35,000 per $mm^2$, the strength of the first region 151 may decrease.

Therefore, by setting the number of crack intersection points 33 per unit area in the first region 151 within the above range, it is possible to suppress the growth of the delamination crack 37 while suppressing the decrease in the strength of the ceramic layer 15.

Figure 4:
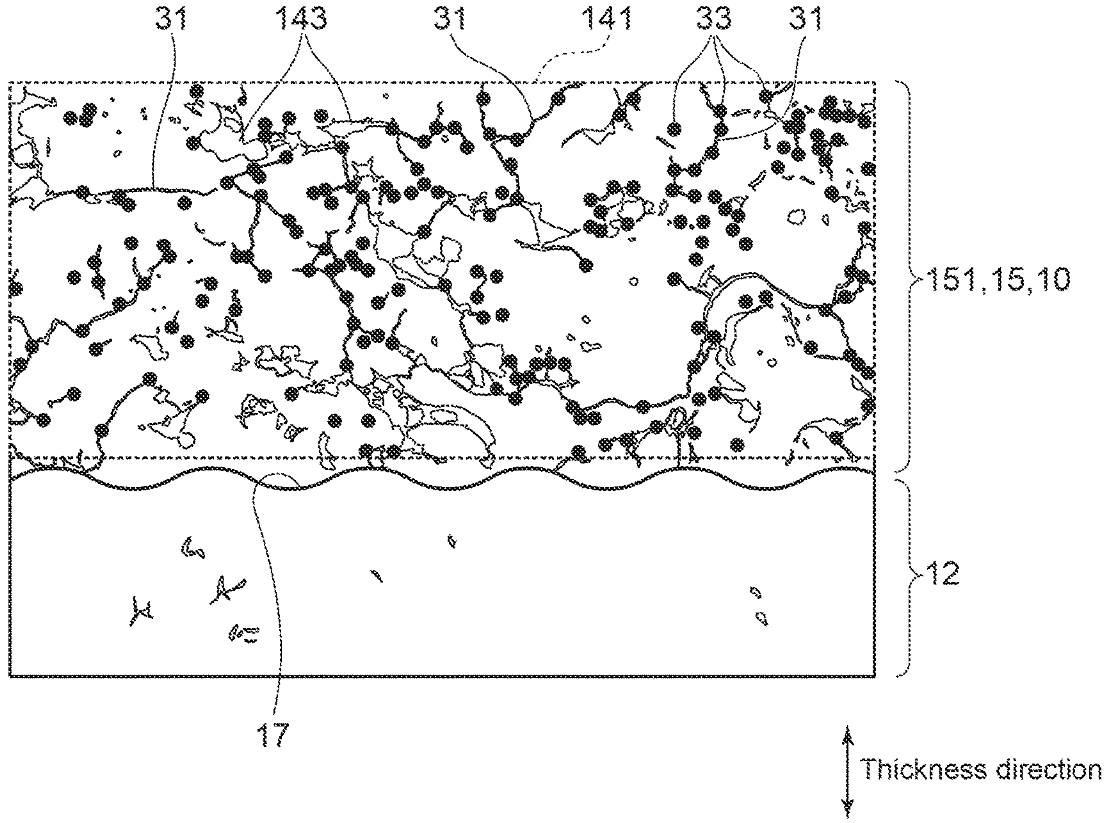
FIG. 4 is an exemplary diagram showing a cross-section of a ceramic layer when the number of crack intersection points per unit area is 15,000 per $mm^2$ or more and 35,000 per $mm^2$ or less.

FIG. 4 is an exemplary diagram showing a cross-section of the ceramic layer 15 when the number of crack intersection points 33 per unit area is 15,000 per $mm^2$ or more and 35,000 per $mm^2$ or less.

Figure 5:
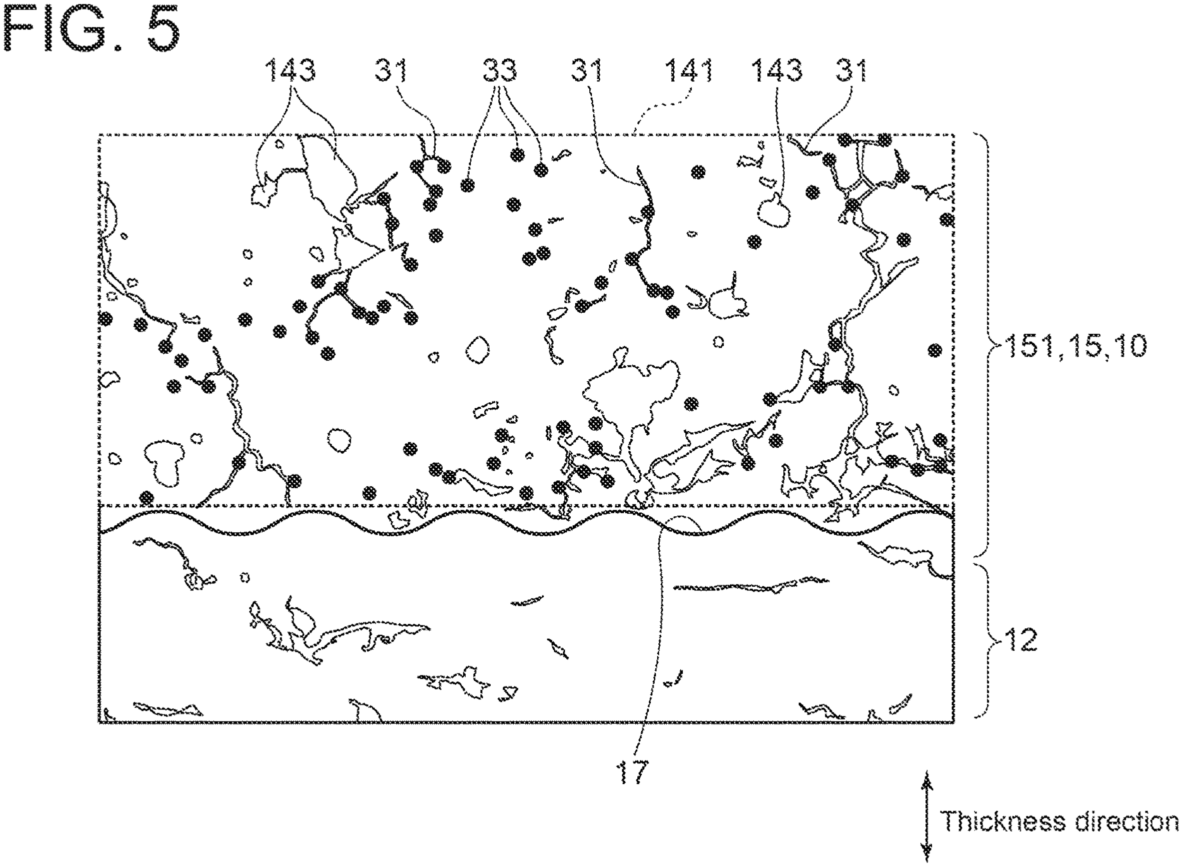
FIG. 5 is an exemplary diagram showing a cross-section of a ceramic layer when the number of crack intersection points per unit area is less than 15,000 per $mm^2$.

FIG. 5 is an exemplary diagram showing a cross-section of the ceramic layer 15 when the number of crack intersection points 33 per unit area is less than 15,000 per $mm^2$.

In FIGS. 4 and 5, a part of the bond coat layer 12 and a part of the first region 151 in the ceramic layer 15 are illustrated.

In FIGS. 4 and 5, black circles are provided at the positions of the crack intersection points 33 existing in a rectangular region 141 surrounded by the dotted line. Further, in FIGS. 4 and 5, the white area surrounded by the solid line represents a pore 143.

In the example shown in FIG. 4, the number of crack intersection points 33 per unit area is about 26,300 per $mm^2$. In the example shown in FIG. 5, the number of crack intersection points 33 per unit area is about 11,100 per $mm^2$.

The number of crack intersection points 33 per unit area is determined as follows.

For example, the cross-section of the ceramic layer 15 is polished to capture an image observed by an electronic microscope. Herein, for determining the number of crack intersection points 33 per unit area, the observation magnification is set to 1000 times, and images are taken at three different positions. Then, in each of the microstructural images (for example, FIG. 4) captured at three different positions, a region 141 for measuring the number of crack intersection points 33 as shown in FIG. 4 is set, and the number of crack intersection points 33 is measured, for example visually, in the region 141. Then, the number of crack intersection points 33 in the region 141 of each of the three different microstructural images is divided by the area of the region 141 to determine the number of crack intersection points 33 per unit area for each of the three different microstructural images. The average of the numbers of crack intersection points 33 per unit area at the three positions thus determined is defined as the number of crack intersection points 33 per unit area in the microstructure.

Figure 6:
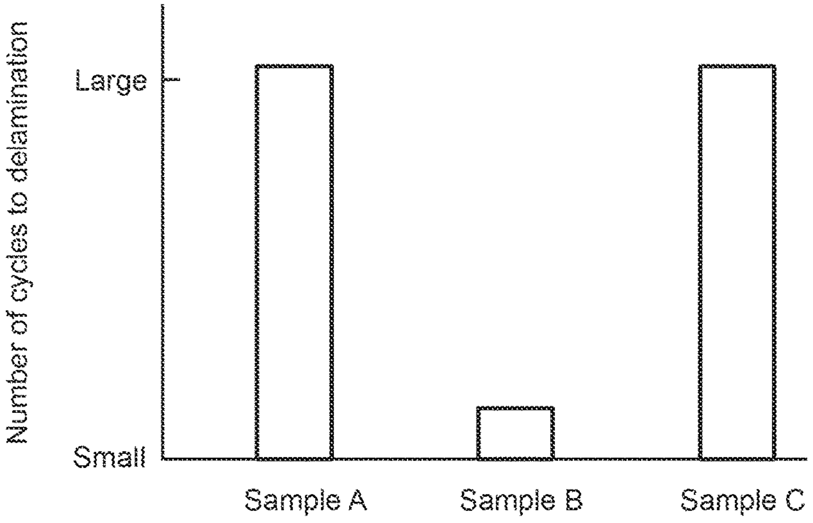
FIG. 6 is a bar graph showing an example of thermal cycle durability of samples.

FIG. 6 is a bar graph showing an example of thermal cycle durability of samples. In FIG. 6, the vertical axis represents the number of cycles to delamination of the ceramic layer formed on the bond coat layer. Samples A to C used in the test were each obtained by forming a bond coat layer and a ceramic layer on the bond coat layer.

In the sample A, a ceramic layer having a microstructure equivalent to the number of crack intersection points 33 per unit area in the cross-sectional view shown in FIG. 5 (about 11,000 per $mm^2$) is formed.

In the sample A, the number of cycles to delamination of the ceramic layer exceeds the number of cycles under which it is determined that the delamination does not occur substantially.

In the sample B, as with the sample A, a ceramic layer having a microstructure equivalent to the number of crack intersection points 33 per unit area in the cross-sectional view shown in FIG. 5 (about 11,000 per $mm^2$) is formed. In the sample B, the ceramic layer is thicker than that in the sample A in order to improve the heat insulation properties, and the thickness is about 1.2 to 2 times the sample A.

In the sample B, the ceramic layer separates at an early stage.

That is, simply increasing the thickness of the ceramic layer in order to improve the heat insulation properties reduces the thermal cycle durability of the ceramic layer.

In the sample C, a ceramic layer having a microstructure equivalent to the number of crack intersection points 33 per unit area in the cross-sectional view shown in FIG. 4 (about 25,000 per $mm^2$) is formed. In the sample C, the ceramic layer is thicker than that in the sample A in order to improve the heat insulation properties, and the thickness is about 1.2 to 2 times the sample A.

In the sample C, the number of cycles to delamination of the ceramic layer exceeds the number of cycles under which it is determined that the delamination does not occur substantially.

That is, even when the thickness of the ceramic layer is increased in order to improve the heat insulation properties, by increasing the number of crack intersection points 33 in the ceramic layer, it is possible to improve the thermal cycle durability of the ceramic layer.

In some embodiments shown in FIGS. 1 and 2, the number of crack intersection points 33 per unit area in the first region 151 may be 1.2 times or more and 3 times or less the number of crack intersection points 33 per unit area in the second region 152.

As a result of diligent studies by the inventors, it has been found that when the number of crack intersection points 33 per unit area in the first region 151 is less than 1.2 times the number of crack intersection points 33 per unit area in the second region 152, the effect of improving the thermal cycle durability of the ceramic coating 10 may decrease. It has been also found that when the number of crack intersection points 33 per unit area in the first region 151 is more than 3 times the number of crack intersection points 33 per unit area in the second region 152, the strength of the first region 151 may decrease.

Thus, according to some embodiments shown in FIGS. 1 and 2, it is possible to suppress the growth of the delamination crack 37 while suppressing the decrease in the strength of the ceramic layer 15.

(Thickness of First Region 151)

In some embodiments shown in FIGS. 1 and 2, the thickness t1 of the first region may be 20 μm or more.

As a result of diligent studies by the inventors, it has been found that when the thickness of the first region 151 is less than 20 μm, the delamination crack 37 may also occur in the second region 152, and the thermal cycle durability may decrease.

Thus, according to some embodiments shown in FIGS. 1 and 2, it is possible to improve the thermal cycle durability of the ceramic coating 10.

In some embodiments shown in FIGS. 1 and 2, the thickness of the first region 151 may be 3% or more of the sum of the thicknesses of the first region 151 and the second region 152.

As a result of diligent studies by the inventors, it has been found that when the thickness t1 of the first region 151 is less than 3% or more of the sum (t1+t2) of the thickness t1 of the first region 151 and the thickness t2 of the second region 152, the effect of improving the thermal cycle durability of the ceramic coating 10 is hardly obtained.

Thus, according to some embodiments shown in FIGS. 1 and 2, it is possible to suppress the growth of the delamination crack 37 while ensuring the heat insulation properties.

The thickness of the ceramic layer 15 may be, but not limited to, 0.1 mm or more and 1 mm or less.

(Porosity)

In some embodiments shown in FIGS. 1 and 2, the first region 151 has a lower porosity than the second region 152.

The delamination crack 37 reaching the pore 143 is equivalent to the delamination crack 37 growing by the size of the pore 143. Further, even if the delamination crack 37 reaches the pore 143, the energy for growing the delamination crack 37 cannot be dispersed unless the cracks 31 other than the delamination crack 37 are connected to the pore 143.

Thus, according to some embodiments shown in FIGS. 1 and 2, since the first region 151 has a lower porosity than the second region 152, the growth of the delamination crack 37 is suppressed in the first region 151 as compared with the second region 152.

The porosity is defined as a percentage of the area of pores 143 in a cross-section of the ceramic layer 15, i.e., a value obtained by dividing the area of pores 143 by the area of the cross-section and then multiplying by 100. Specifically, the porosity is determined as follows: For example, the cross-section of the ceramic layer 15 is polished to capture an image observed by an optical microscope or an electronic microscope. Herein, for determining the porosity, the observation magnification is set to 100 times, and images are taken at three different positions. The area per observation field is about 0.5 square millimeters. Then, each of the microstructural images (for example, FIG. 4) captured at three different positions is binarized so that the pore part (void part) and the film part can be separately extracted. Then, the area of the pore part and the area of the film part are calculated from the binary images of the three different positions, and the area of the pore part is divided by the sum of the areas of the pore and film parts, i.e., the area of the cross-section, to calculate the porosity. Alternatively, the area of the pore part and the area of the cross-section may be calculated from each binary image, and the area of the pore part may be divided by the area of the cross-section to calculate the porosity. The average of the porosities at the three positions thus determined is defined as the porosity in the microstructure.

In some embodiments shown in FIGS. 1 and 2, the first region 151 may have a porosity of 3% or more and 40% or less.

According to diligent studies by the inventors, in order to obtain the first region 151 having a porosity of less than 3%, a large-scale apparatus including a chamber is required, such as an apparatus for coating by the chemical vapor deposition method, for example. Further, if the porosity of the first region 151 is more than 10%, the adhesion between the ceramic layer 15 and the bond coat layer 12 may be insufficient.

Thus, according to some embodiments shown in FIGS. 1 and 2, a durable ceramic coating 10 can be obtained relatively easily.

(Third Region 153)

In the ceramic coating 10 according to another embodiment shown in FIG. 2, as described above, the ceramic layer 15 has a third region 153 father away from the interface 17 than the second region 152 from the interface 17. In the ceramic coating 10 according to another embodiment shown in FIG. 2, the third region 153 may have a lower porosity than the second region 152.

According to another embodiment shown in FIG. 2, the second region 152 ensures the heat insulation properties of the ceramic coating, while the third region 153, which has a dense microstructure with a lower porosity than the second region 152, suppresses the permeation of corrosive substances contained in combustion gas, for example. Thus, it is possible to improve the durability of the ceramic coating 10 while suppressing the deterioration of the ceramic coating 10.

Still Another Embodiment

As described above, the ceramic coating 10 according to still another embodiment shown in FIG. 7 includes the ceramic layer 15 formed on the bond coat layer 12. In still another embodiment shown in FIG. 7, in a cross-section along the thickness direction of the ceramic layer 15, the number of crack intersection points 33 at which two or more cracks 31 intersect per unit area in a region (substrate-side region) 154 within at least 100 μm from an interface 17 between the ceramic layer 15 and the bond coat layer 12 may be 15,000 per $mm^2$ or more and 35,000 per $mm^2$ or less.

As with the embodiments shown in FIGS. 1 and 2, when the number of crack intersection points 33 per unit area in the substrate-side region 154 is less than 15,000 per $mm^2$, the effect of improving the thermal cycle durability of the ceramic coating 10 is hardly obtained. Further, when the number of crack intersection points 33 per unit area is more than 35,000 per $mm^2$, the strength of the substrate-side region 154 may decrease.

Therefore, by setting the number of crack intersection points 33 per unit area in the substrate-side region 154 to 15,000 per $mm^2$ or more and 35,000 per $mm^2$ or less, it is possible to suppress the growth of the delamination crack 37 while suppressing the decrease in the strength of the ceramic layer 15.

In still another embodiment shown in FIG. 7, the substrate-side region 154 may have a porosity of 3% or more and 40% or less.

As described above, in order to obtain the substrate-side region 154 having a porosity of less than 3%, a large-scale apparatus including a chamber is required, such as an apparatus for coating by the chemical vapor deposition method, for example. Further, if the porosity of the substrate-side region 154 is more than 40%, the adhesion between the ceramic layer 15 and the bond coat layer 12 may be insufficient.

Thus, according to still another embodiment shown in FIG. 7, a durable ceramic coating 10 can be obtained relatively easily.

(Turbine Component and Gas Turbine)

The ceramic coating 10 according to the above-described embodiments is suitably applicable to hot parts such as rotor blades and stator blades of an industrial gas turbine, combustor baskets, transition pieces, and ring segments. Further, it can be applied not only to industrial gas turbines, but also to thermal barrier coating films for hot parts of engines of automobiles and jets. By forming the thermal barrier coating according to the above-described embodiments on these structures, it is possible to obtain gas turbine blades and hot parts excellent in corrosion resistance and thermal cycling durability.

Figure 8:
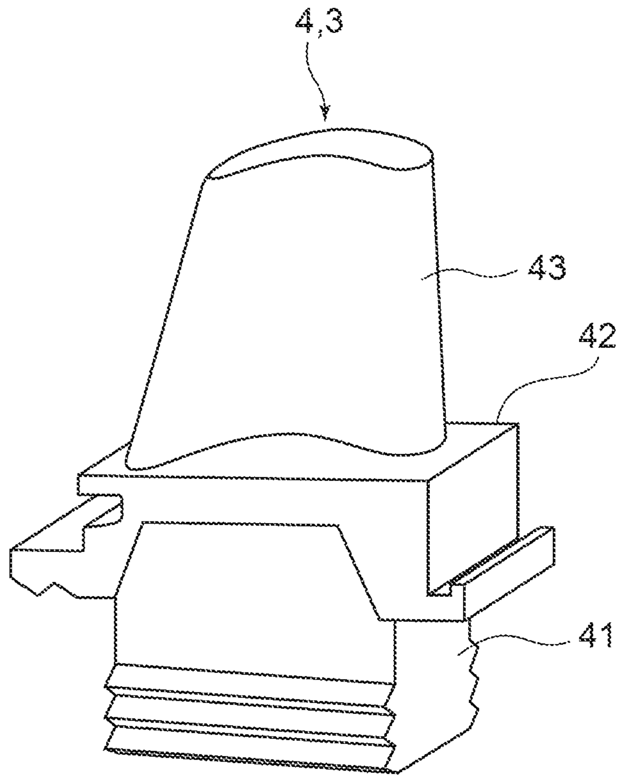
FIG. 8 is a perspective diagram of a gas turbine rotor blade.
Figure 9:
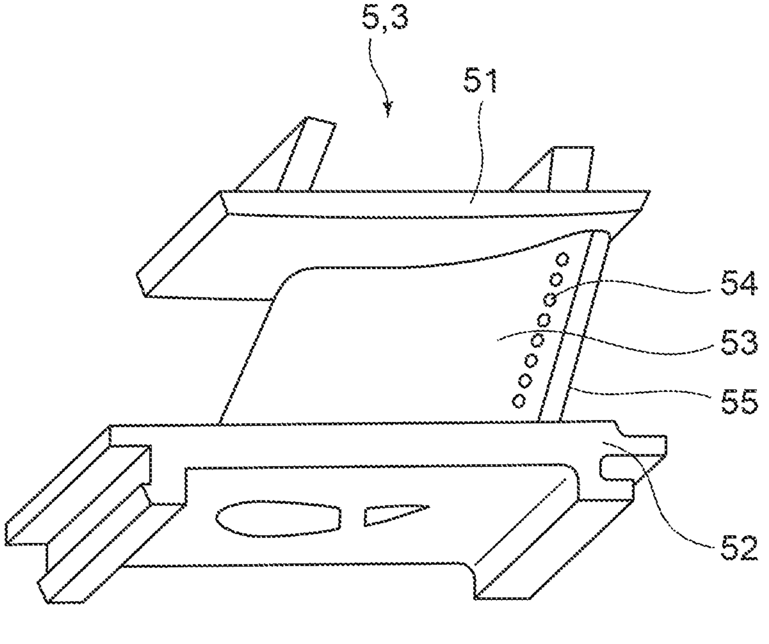
FIG. 9 is a perspective diagram of a gas turbine stator blade.
Figure 10:
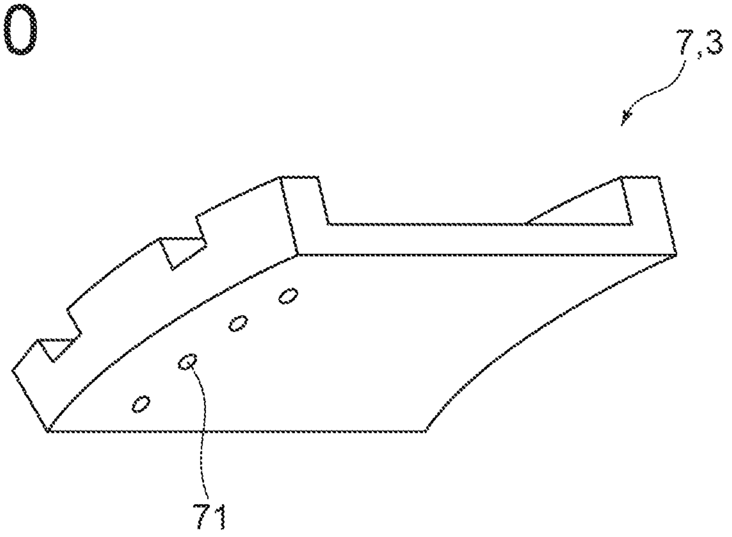
FIG. 10 is a perspective diagram of a ring segment.
Figure 11:
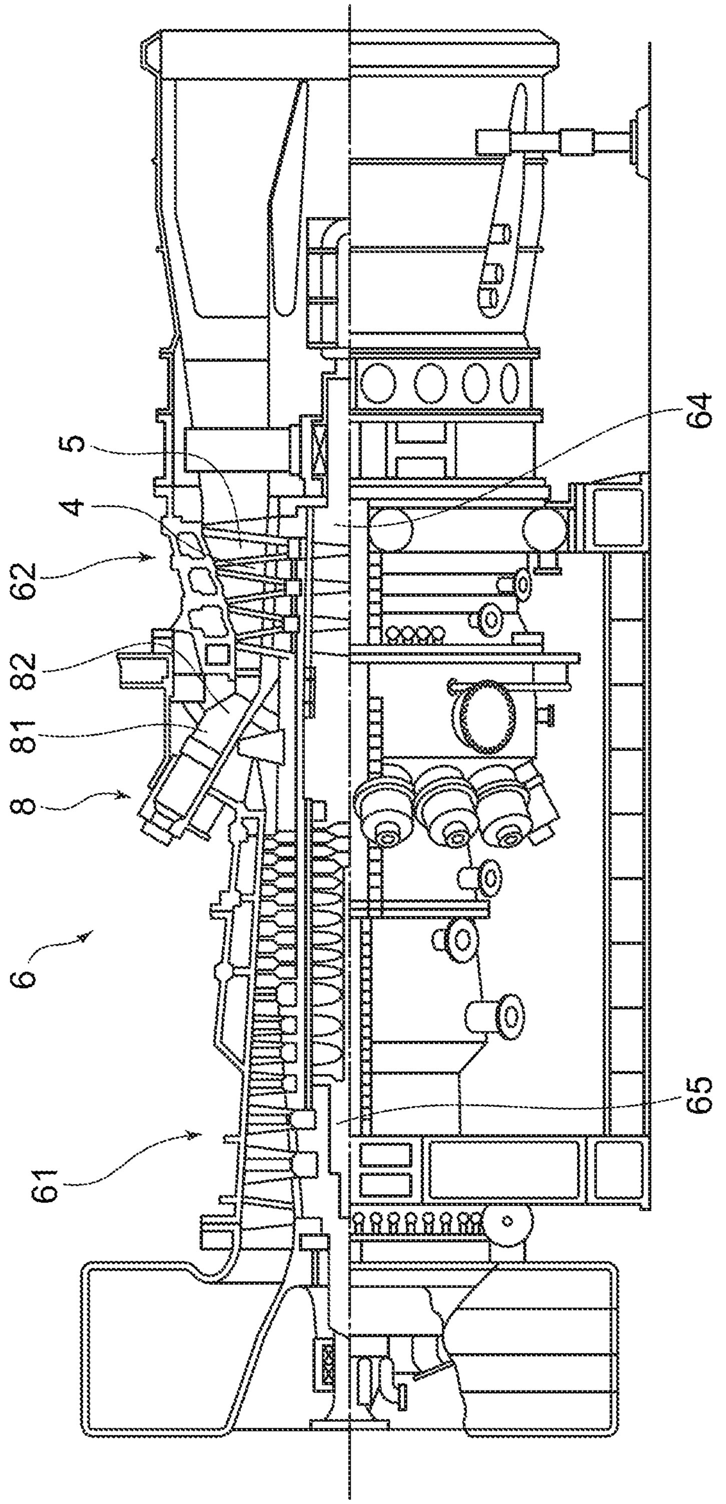
FIG. 11 is a schematic diagram of a partial cross-sectional structure of a gas turbine according to an embodiment.

FIGS. 8 to 10 are perspective views of configuration examples of a turbine component 3 to which the ceramic coating 10 according to the above-described embodiments can be applied. FIG. 11 is a schematic partial cross-sectional view of a gas turbine 6 according to an embodiment. As configuration examples of the turbine component to which the ceramic coating 10 according to the above-described embodiments can be applied, there may be mentioned a gas turbine rotor blade 4 shown in FIG. 8, a gas turbine stator blade 5 shown in FIG. 9, a ring segment 7 shown in FIG. 10, and a combustor 8 of a gas turbine 6 shown in FIG. 11. The gas turbine rotor blade 4 shown in FIG. 8 includes a dovetail 41 fixed to the disk, a platform 42, and an airfoil portion 43. The gas turbine stator blade 5 shown in FIG. 9 includes an inner shroud 51, an outer shroud 52, and an airfoil portion 53. The airfoil portion 53 has seal fin cooling holes 54 and a slit 55.

The ring segment 7 shown in FIG. 10 is a member formed by dividing an annular member in the circumferential direction. Multiple ring segments 7 are disposed outside the gas turbine rotor blades 4 and held by a casing of a turbine 62. The ring segment 7 shown in FIG. 10 has cooling holes 71. The combustor 8 of the gas turbine 6 shown in FIG. 11 includes a combustor basket 81 and a transition piece 82 as a liner.

Next, with reference to FIG. 11, a gas turbine 6 to which the turbine component 3 can be applied will be described. FIG. 11 is a schematic partial cross-sectional view of a gas turbine 6 according to an embodiment. The gas turbine 6 includes a compressor 61 and a turbine 62 directly connected to each other. The compressor 61 is configured, for example, as an axial flow compressor, which sucks the atmospheric air or a predetermined gas through a suction port as a working fluid and pressurizes the gas. A discharge port of the compressor 61 is connected to the combustor 8, and the working fluid discharged from the compressor 61 is heated by the combustor 8 to a predetermined turbine inlet temperature. The working fluid heated to the predetermined temperature is supplied to the turbine 62. As depicted in FIG. 11, inside a casing of the turbine 62, a plurality of stages of the gas turbine stator blades 5 are provided. Further, the gas turbine rotor blades 4 are attached to a main shaft 64 so that each forms a single stage with the corresponding stator blade 5. One end of the main shaft 64 is connected to a rotational shaft 65 of the compressor 61, and the other end is connected to a rotational shaft of a generator not depicted.

With this configuration, as a working fluid at high temperature and high pressure is supplied from the combustor 8 to the casing of the turbine 62, the working fluid expands in the casing and rotates the main shaft 64, consequently driving the generator (not shown) connected to the gas turbine 6. Specifically, the pressure is reduced by each stator blade 5 fixed to the casing, and the resulting kinetic energy is converted to rotational torque via each rotor blade 4 attached to the main shaft 64. Then, the generated rotational torque is transmitted to the main shaft 64 and drives the generator.

Generally, the material used for gas turbine rotor blades is heat resistant alloy (e.g., IN738LC, commercial alloy material manufactured by Inco), and the material used for gas turbine stator blades is also heat-resistant alloy (e.g., IN939, commercial alloy material manufactured by Inco). That is, the material of turbine blades is heat resistant alloy that can be used for the heat resistant substrate 11 of the thermal barrier coating according to the above-described embodiments. Therefore, by applying the ceramic coating 10 according to the above-described embodiments to turbine blades, it is possible to obtain turbine blades excellent in thermal barrier effect, erosion resistance, and durability. Such turbine blades can be used in a higher temperature environment, with a long lifetime. Further, the applicability in higher temperature environment allows the working fluid to be heated, so that the gas turbine efficiency can be improved.

Thus, since the turbine component 3 according to some embodiments has the ceramic coating 10 according to the above-described embodiment, it is possible to improve the thermal cycle durability of the ceramic coating 10, and it is possible to improve the durability of the turbine component 3.

Further, since the gas turbine 6 according to some embodiments has the turbine component 3, it is possible to improve the durability of turbine component 3 in the gas turbine 6.

The present disclosure is not limited to the embodiments described above, but includes modifications to the embodiments described above, and embodiments composed of combinations of those embodiments.

(1) A ceramic coating 10 according to at least one embodiment of the present disclosure includes: a bond coat layer 12 formed on a substrate (heat resistant substrate 11); and a ceramic layer 15 formed on the bond coat layer 12. The ceramic layer 15 has a first region 151 in contact with an interface 17 between the ceramic layer 15 and the bond coat layer 12 and a second region 152 father away from the interface 17 than the first region 151 from the interface 17. In a cross-section along the thickness direction of the ceramic layer 15, the number of crack intersection points 33 at which two or more cracks 31 intersect per unit area in the ceramic layer 15 is larger in the first region 151 than in the second region 152.

According to the above configuration (1), since the number of crack intersection points 33 per unit area is larger in the first region 151 than in the second region 152, as described above, the growth of the delamination crack 37 is suppressed in the first region 151 as compared with the second region 152. Therefore, in the first region 151 where the delamination crack 37 is more likely to occur than in the second region 152, the growth of the delamination crack 37 can be effectively suppressed, and the thermal cycle durability of the ceramic coating 10 can be improved.

(2) In some embodiments, in the above configuration (1), the number of crack intersection points 33 per unit area in the first region 151 is 15,000 per $mm^2$ or more and 35,000 per $mm^2$ or less.

According to the above configuration (2), it is possible to suppress the growth of the delamination crack 37 while suppressing the decrease in the strength of the ceramic layer 15.

(3) In some embodiments, in the above configuration (2), the thickness of the first region 151 is 30 μm or more.

According to the above configuration (3), it is possible to improve the thermal cycle durability.

(4) In some embodiments, in any one of the above configurations (1) to (3), the number of crack intersection points 33 per unit area in the first region 151 is 1.2 times or more and 3 times or less the number of crack intersection points 33 per unit area in the second region 152.

According to the above configuration (4), it is possible to suppress the growth of the delamination crack 37 while suppressing the decrease in the strength of the ceramic layer.

(5) In some embodiments, in any one of the above configurations (1) to (4), the first region 151 has a lower porosity than the second region 152.

According to the above configuration (5), since the first region 151 has a lower porosity than the second region 152, the growth of the delamination crack 37 is suppressed in the first region 151 as compared with the second region 152.

(6) In some embodiments, in the above configuration (5), the first region 151 has a porosity of 3% or more and 40% or less.

According to the above configuration (6), a durable ceramic coating 10 can be obtained relatively easily.

(7) In some embodiments, in the above configuration (5) or (6), the thickness t1 of the first region 151 is 3% or more of the sum (t1+t2) of the thicknesses of the first region 151 and the second region 152.

According to the above configuration (7), it is possible to suppress the growth of the delamination crack 37 while ensuring the heat insulation properties.

(8) In some embodiments, in any one of the above configurations (5) to (7), the ceramic layer 15 has a third region 153 farther away from the interface 17 than the second region 152 from the interface 17. The third region 153 has a lower porosity than the second region 152.

According to the above configuration (8), the second region 152 ensures the heat insulation properties of the ceramic coating 10, while the third region 153 suppresses the permeation of corrosive substances.

(9) A ceramic coating 10 according to at least one embodiment of the present disclosure includes: a bond coat layer 12 formed on a substrate; and a ceramic layer 15 formed on the bond coat layer 12. In a cross-section along the thickness direction of the ceramic layer 15, the number of crack intersection points 33 at which two or more cracks 31 intersect per unit area in a region (substrate-side region) 154 within at least 100 μm from an interface 17 between the ceramic layer 15 and the bond coat layer 12 is 15,000 per $mm^2$ or more and 35,000 per $mm^2$ or less.

According to the above configuration (9), it is possible to suppress the growth of the delamination crack 37 while suppressing the decrease in the strength of the ceramic layer 15.

(10) In some embodiments, in the above configuration (9), the region (substrate-side region) 154 has a porosity of 3% or more and 40% or less.

According to the above configuration (10), a durable ceramic coating 10 can be obtained relatively easily.

(11) A turbine component 3 according to at least one embodiment of the present disclosure includes the ceramic coating 10 according to any one of the above configurations (1) to (10).

According to the above configuration (11), it is possible to improve the thermal cycle durability of the ceramic coating 10, and it is possible to improve the durability of the turbine component 3.

(12) A gas turbine 6 according to at least one embodiment of the present disclosure includes the turbine component 3 according to the above configuration (11).

According to the above configuration (12), it is possible to improve the durability of the turbine component 3 in the gas turbine 6.

REFERENCE SIGNS LIST

3 Turbine component
6 Gas turbine
10 Ceramic coating
11 Heat resistant substrate (Base material)
12 Metallic bond layer (Bond coat layer)
15 Ceramic layer
17 Interface
31 Crack
33 Crack intersection point
37 Lateral crack (Delamination crack)
151 First region
152 Second region
153 Third region

The invention claimed is:

1. A ceramic coating, comprising:
a bond coat layer formed on a substrate; and
a ceramic layer formed on the bond coat layer;
wherein the ceramic layer has a first region in contact with an interface between the ceramic layer and the bond coat layer and a second region father away from the interface than the first region from the interface,
wherein, in a cross-section along a thickness direction of the ceramic layer, the number of crack intersection points at which two or more cracks intersect per unit area in the ceramic layer is larger in the first region than in the second region, and
wherein the number of crack intersection points per unit area in the first region is 15,000 per $mm^2$ or more and 35,000 per $mm^2$ or less.

2. The ceramic coating according to claim 1,
wherein the thickness of the first region is 20 μm or more.

3. The ceramic coating according to claim 1,
wherein the number of crack intersection points per unit area in the first region is 1.2 times or more and 3 times or less the number of crack intersection points per unit area in the second region.

4. The ceramic coating according to claim 1,
wherein the first region has a lower porosity than the second region.

5. The ceramic coating according to claim 4,
wherein the first region has a porosity of 3% or more and 40% or less.

6. The ceramic coating according to claim 4,
wherein the thickness of the first region is 3% or more of a sum of the thicknesses of the first region and the second region.

7. The ceramic coating according to claim 4,
wherein the ceramic layer has a third region farther away from the interface than the second region from the interface, and
wherein the third region has a lower porosity than the second region.

8. A turbine component, comprising the ceramic coating according to claim 1.

9. A gas turbine, comprising the turbine component according to claim 8.

* * * * *